United States Patent [19]

von Benda et al.

[11] 4,230,778
[45] Oct. 28, 1980

[54] SODIUM-SULFUR BATTERY WITH GLASS ELECTROLYTE

[75] Inventors: Klaus von Benda, Ostfildern; Holger Kistrup, Stuttgart, both of Fed. Rep. of Germany

[73] Assignee: Deutsche Automobilgesellschaft mbH, Hanover, Fed. Rep. of Germany

[21] Appl. No.: 21,208

[22] Filed: Mar. 16, 1979

[30] Foreign Application Priority Data

Mar. 17, 1978 [DE] Fed. Rep. of Germany ....... 2811687

[51] Int. Cl.³ .......................................... H01M 10/39
[52] U.S. Cl. .................................................. 429/104
[58] Field of Search ........................................ 429/104

[56] References Cited

U.S. PATENT DOCUMENTS

| | | | |
|---|---|---|---|
| 3,535,163 | 10/1970 | Dzieciuch et al. | 429/104 |
| 3,679,480 | 7/1972 | Brown et al. | 429/104 |
| 4,018,969 | 4/1977 | Fischer et al. | 429/104 |
| 4,029,858 | 6/1977 | Evans et al. | 429/104 |
| 4,038,462 | 7/1977 | Rohr | 429/104 |
| 4,038,464 | 7/1977 | Baukal et al. | 429/104 |

FOREIGN PATENT DOCUMENTS 2093105  1/1972  France ..................................... 429/104

*Primary Examiner*—Donald L. Walton
*Attorney, Agent, or Firm*—Browdy and Neimark

[57] ABSTRACT

A sodium-sulfur battery in which the sulfur or sulfur-containing positive electrode material is contained in a number of sealed tubes made from a sodium ion-conducting glass electrolyte. The tubes are placed and electrically conducted in parallel and immersed in the sodium constituting the negative electrode. Each of the capillary tubes contains a sealed-in electrical contact wire which passes through an appropriate closure plate to constitute the positive pole of the battery. A number of embodiments is described. The invention also describes the method of construction of the battery.

21 Claims, 6 Drawing Figures

SODIUM-SULFUR BATTERY WITH GLASS ELECTROLYTE

FIELD OF THE INVENTION

The invention relates to storage batteries, in particular to storage batteries in which the active mass of the negative electrode is sodium and the active mass of the positive electrode is sulfur or a sulfur-containing substance. The two electrode spaces are separated by a solid electrolyte made from hollow glass tubes and capable of conducting sodium ions. In normal operation, the chemical reactants are at least partially liquified due to elevated temperature. The electrical discharge of the battery is accompanied by a reduction in volume of the negative material and an increase in volume of the positive material.

BACKGROUND OF THE INVENTION

Sodium-sulfur batteries are known in the art and are described for example in U.S. Pat. Nos. 3,476,602 and 3,679,480. A solid glass electrolyte is described for example in U.S. Pat. No. 3,829,331. The general state of the art is described in the article "The Dow Sodium Sulfur Battery", which appeared in the Journal: Proceedings of the 7th IECEC, 1972, pages 50–53, published by the American Chemical Society, 1972.

According to the aforementioned article, a battery of the capacity of 40 Ampere-hours contains 27,000 glass fibers of a length of 11.5 cm. The fibers are filled with sodium and communicate with a sodium reservoir via a perforated plate. The perforated plate constitutes a wall of the reaction chamber which contains the positive mass and the glass capillary tubes. The very large number of fibers is necessitated by the high specific resistivity of the glass (quoted in the above article to be $5 \times 10^5$ ohm-cm) coupled with the requirement for a relatively low internal battery resistance. The large number of fibers creates a large surface area of the electrolyte and makes possible a relatively low operational current density of only a few mA/cm$^2$.

It is apparent that the disposition and filling of such a very large number of glass capillaries is technically difficult and economically expensive. A critical factor in the construction of such a cell is the tendency of the glass to fracture in the transition zone from the hollow fiber having a wall thickness of approximately $10^{-2}$ mm to the perforated plate which is of approximately a thickness of 5 mm. Another factor contributing to a difficult construction is the tendency of the capillary wall to be deformed in the transition region.

A further problem arises from the corrosiveness of the positive electrode mass. According to U.S. Pat. No. 3,749,603, current is conducted away from the capillaries by an aluminum foil coated with MoS$_2$. This protective coating must be perfectly continuous and pore-free and thus requires a relatively high effort to obtain, especially because each capillary must be associated with a particular section of foil at a predetermined distance.

It does appear clear that it would be a substantial advantage if the specific resistivity of the glass electrolyte could be reduced because a corresponding reduction of the number of capillary tubes would then be possible for a given capacity. Furthermore, for a given total weight of glass electrolyte the diameter of each capillary tube could be substantially enlarged which would facilitate the construction and reduce the cost.

OBJECT AND SUMMARY OF THE INVENTION

It is thus a principal object of the present invention to provide an electric battery of the type using electrodes of sodium and sulfur or a sulfur-containing substance in which the electrolyte is a solid, sodium ion-conducting glass electrolyte whose specific resistivity is substantially lower than that previously known in the art. It is an associated object of the invention to provide a battery in which the glass electrolyte has a corrosion resistance substantially higher than that previously known. The glass electrolyte which is used in the construction of the sodium-sulfur cell of the present invention is described separately in a copending patent application Ser. No. 021,952 filed Mar. 19, 1979, entitled "SODIUM ION CONDUCTING GLASS ELECTROLYTE FOR SODIUM SULFUR BATTERIES". The objects of the present invention are attained by making use of the glass electrolyte described in the above-mentioned copending application for the construction of a relatively small number of capillary tubes of relatively large diameter and by disposing the positive electrode mass within the fully encapsulating glass capillary tubes. It is a further feature of the invention to seal a metallic wire in the capillary tube to serve as an electrical contact. The wire is passed through the glass envelope and extends within the capillary tube substantially throughout its entire length, leaving a radial space for receiving the positive mass.

Advantageously, the electrical connecting wires are stainless steel wires having a linear coefficient of expansion in the range between 1.0 and $2.0 \times 10^{-5} \text{K}^{-1}$. Especially preferred are steels such as exemplified by the German Industrial Standard designations (DIN) $\times$ 12C-rNi18 8, $\times$ 10CrNiTi 18 9, $\times$ 5CrNiMo 18 10, $\times$ 10CrNiMoTi 18 10, $\times$ CrNiMo 17 13. The preferred wire diameter lies in the range between 0.05 and 0.5 mm.

The capillary tubes which contain the positive electrode mass are disposed in parallel within the housing which also holds the negative electrode mass, i.e., the sodium metal. The positive current-conducting wires are passed, singly or in bunches, through an insulating plate which closes the battery housing. Preferred materials for the closure plate include the electrolyte glass used in the construction of the capillary tubes themselves, MgO ceramics, or some mixture of MgO and electrolyte glass.

The advantages deriving from the sodium-sulfur batteries according to the invention which employ a glass electrolyte include the following:

A first and principal advantage is the elimination of the insulating perforated plate of the prior art which is replaced in the apparatus of the invention by a fully obturated closure plate. As will be illustrated in a first embodiment of the invention, the capillary tubes themselves need not be fused with the closure plate, thereby substantially reducing the probability of breakage. If a fusion with the closure plate is desired, as will be described in connection with the second embodiment, the presence of the conducting wire in each of the seals between a capillary tube and the closure plate imparts to them a substantial mechanical strength which facilitates assembly, especially because the capillary tubes are closed in the seal region.

Another advantage derives from the simple possibility of filling the capillary tubes with molten sulfur and the elimination of wetting problems by sodium, and an improved thermal transfer due to the contact of the sodium with the outer housing. Still another advantage derives from the elimination of any necessity for coating electrical contact foils for contacting the positive electrode mass and because of the elimination of the necessity to arrange the capillary tubes in strictly defined association with the electrode foils.

The battery according to the present invention will be especially economical if the wires used in each capillary tube are themselves available economically. While the advantages deriving from the battery according to the invention extend over the use of very fine capillaries, having diameters of 0.01 to 0.1 mm, at the present time an outer diameter of 0.1 mm to 1 mm. is most economical. Preferably, the volume within the capillaries occupied by the wires is between 1 and 15% of the total internal volume.

Since the wire sectional aera is small compared to that of the capillary, the wire may be kept substantially clear of the interior tube wall by periodically sharply deforming, for instance by kinking, the wire so that the deformed parts of the wire will rest against the glass wall. The wire my be introduced into the capillary tube simultaneously with formation of said tube from the melt by feeding the wire continuously into the air feed of a melt drawing device.

In order to enhance the conduction of current, the wire may be passed through the entire capillary tube and sealed at both ends. In such a construction, the battery housing is closed at two ends by two separate closure plates.

The distribution and arrangement of the capillary tubes can vary depending on the amount of sodium which it is desired to have present between the capillary tubes. Accordingly, the capillary tubes may be arranged in squares, rectangles or diamond-shaped arrays with or without mutual contact.

The capillary tubes may fill the cross section of the housing uniformly or non-uniformly. Their length may be substantially that of the housing but they may also be shorter than the housing as illustrated in the embodiments 2 and 3 below. In this manner, the housing may define sodium reservoirs which are free from capillary tubes. However, it is a feature of the present invention which is distinct from the prior art that no insulating separating plate is required between the spaces occupied by the capillary tubes and the sodium reservoir spaces.

It will be appreciated by a person skilled in the art that the positive conducting wires need not be made completely of stainless steel but may be, for example, iron wires which are suitably coated with an anti-corrosive layer.

The overall resistance of the electrode wires may be further reduced by doubling the thickness of the wire externally of the capillary tubes.

Other features and advantages of the invention will emerge from the following description of a number of preferred exemplary embodiments taken together with the drawing.

DESCRIPTION OF THE PREFERRED EMBODIMENTS

Figure 1:
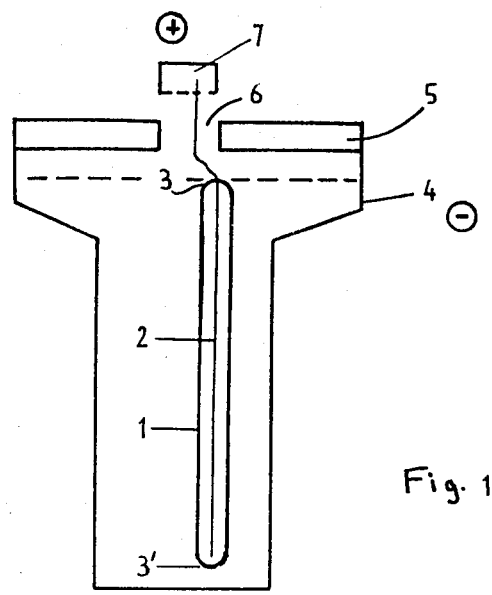
FIGS. 1-6 are illustrations of different embodiments of construction of the sodium-sulfur battery according to the invention.

FIG. 1 illustrates a first embodiment of the battery according to the invention which includes a bundle of parallel glass electrolyte capillary tubes 1 of equal length and diameter. Each tube contains sulfur as the positive electrode mass and is sealed at both ends 3, 3'. Each tube also contains an electric contact wire 2 which passes through the end 3 of each tube. The wire is sealed to the glass at the point of passage without voids. The battery has a housing 4 which contains sodium as the negative electrode mass. The housing 4 is made from steel, for example of the type V2A. The housing 4 is closed by a closure plate 5 made of MgO which has a central opening 6 through which pass the bundled electrode wires 2 and in which they are soldered with glass and combined to a pole piece 7. The amount of sodium and the distance between the capillary tubes 1 is so chosen that the maximum level of liquid sodium will be below the plane of the tube seals 3. In this embodiment of the invention, the capillary tubes are joined to the closure plate 5 only via the relatively thin and deformable elctrical conducting wires. The insulating magnesia plate 5 may also be replaced by a steel plate which is welded appropriately to the wire bundle and sealed and insulated with respect to the housing.

Figure 2:
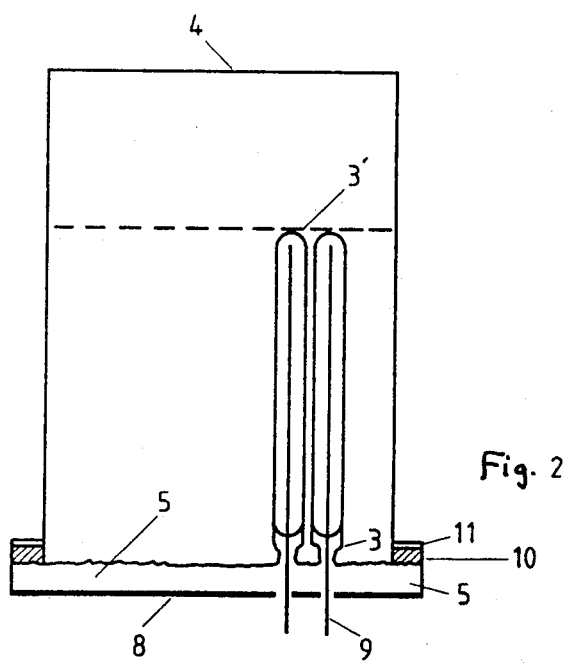

FIG. 2 illustrates a second embodiment of the invention containing as before a number of parallel and identical glass capillaries each having the approximate composition 40 Mole% $Na_2O$, 12 Mole% $Al_2O_3$ and 48 Mole% $SiO_2$. The same composition of glass is used in all the embodiments described. At one end of the capillary tubes, a wire is sealed into the glass over a length of between 0.5 and 3 cm without the creation of voids. The capillary tubes are bundled in such a manner that each tube makes contact with four neighboring tubes so as to define a squaric array while the overall shape of the capillary bundle is a cylinder. Placed on the capillary bundle is a metallic perforated member 8, preferably a wire mesh or a perforated sheet made of V2A steel so that the uninsulated wire ends 9 pass through the openings of the perforated member whereas the seal points 3 are positioned substantially above the perforated member 8. By heating inductively or by flame and pressing against the seals 3, the perforated member 8 is fused to the capillary bundle, thereby creating a continuous insulating glass surface 5 underneath the perforated member which serves to insulate it against contact with sodium and which constitutes the closure plate. Even though the glass is a conductor of ions, it acts as an insulator due to a suitable choice of the thickness, and the insulating property may be further enhanced by the addition of insulating materials having approximately the same thermal expansion, for example MgO. The presence of the wire mesh or the perforated foil lends particular mechanical strength to the closure plate 5. The plate 5 serves as the lower closure member of the housing 4. In order to seal the assembly with respect to the housing 4 which is made of V2A steel, the edge of the perforated member not containing conducting wires is also glazed and fused with a ceramic MgO ring 10. The ring 20 is then fused to the flange 11 of the housing by means of electrolyte glass. The resultant assembly thus consists of materials all of which have approximately the same degree of thermal expansion and provide a reliable seal.

A space between the contact-free ends 3' of the capillary tubes and the upper housing cover is filled with sodium; when the battery is fully discharged, the sodium level drops to the plane of the tube ends 3'.

Figure 3:
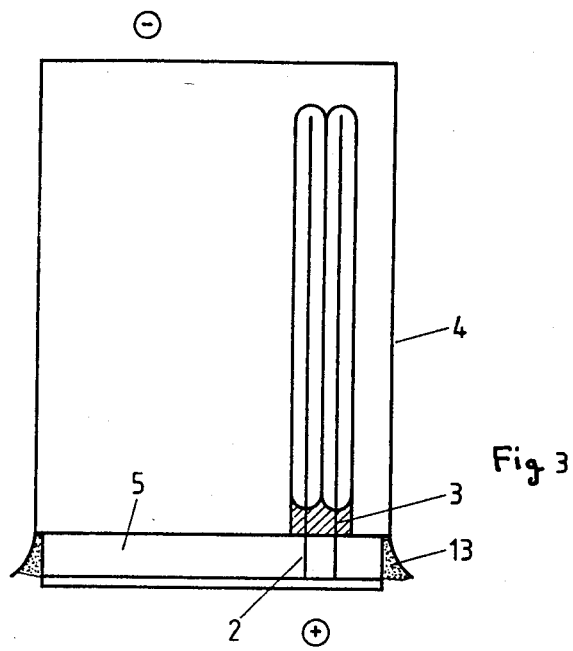

The battery illustrated in FIG. 3 contains a bundle of tubes similar to that illustrated in FIG. 2. In the region of the seals 3, the capillaries are fused to create a closure plate 5, with the addition of glass and optionally other materials such as MgO, and the conducting wires 2 pass through the closure plate 5 formed in this manner and are joined in a suitable manner to constitute a positive pole. The block of capillaries is inserted in a steel housing 4 whose upper diameter is enlarged in the region of the closure plate so as to insure sufficient insulation after glass is poured into the annular gap 13 and the closure plate is fused to the edge of the housing.

Figure 4:
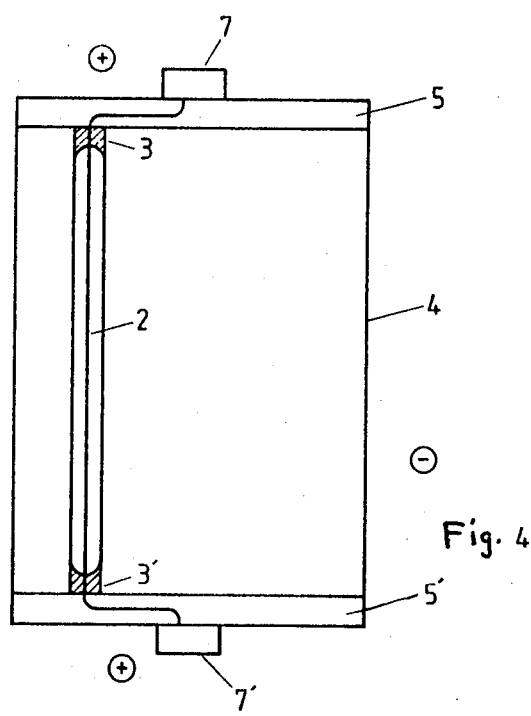

In the embodiment of FIG. 4, each capillary tube 1 has two electrical contacts, constituted by a continuous wire 2 passing through both ends 3, 3' of the tube and sealed therewith. Opposite ends of the housing 4 are sealed by closure plates 5, 5' on which are mounted two positive poles 7, 7'. The negative battery terminal is the steel housing.

Figure 5:
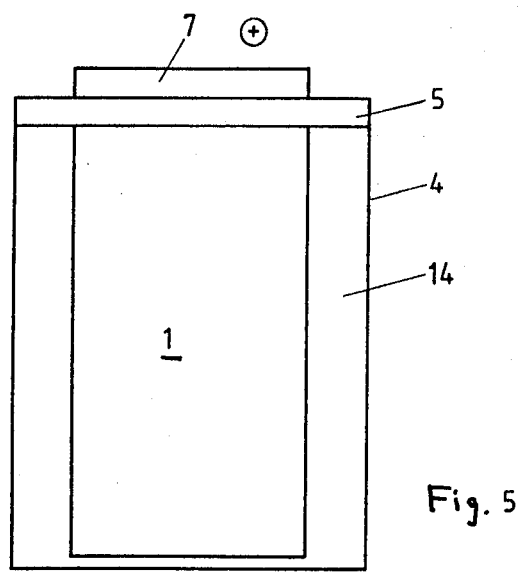

FIG. 5 illustrates another embodiment of the invention in which the capillary tubes are close packed into a cylindrical bundle 1 in the center of a cylindrical housing 4. The quantity of sodium which is displaced in a full discharge of the battery is located in the annular gap 14 between the capillary bundle and the housing. The capillary force within the fiber bundle is greater than that in the annular gap so that even when the battery is discharged, the sodium remains in contact with the full length of the fibers while the level of sodium within the annular outer volume drops.

Figure 6:
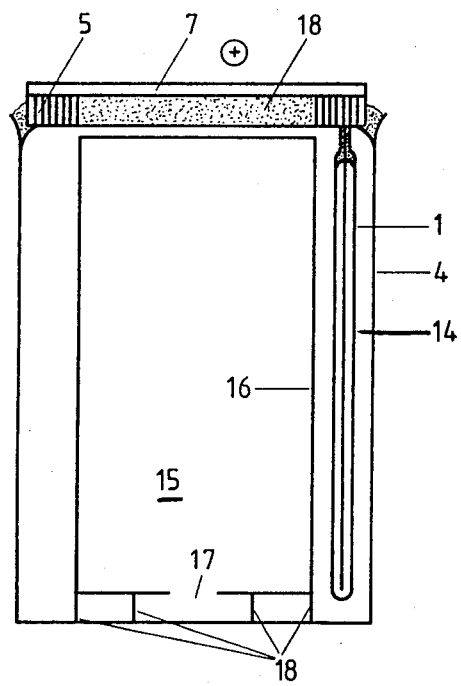

FIG. 6 illustrates an embodiment in which the capillary tubes 1 are arranged in an annular gap 14 defined between the interior wall of the cylindrical housing 4 and the aluminum housing 16 of a cylindrical sodium reservoir 15. The bottom plate of the sodium reservoir has a narrowly dimensioned hole 17 so as to limit the flow of sodium in the case of damage to the housing and it is raised above the base of the housing 4 by means of bridges or ribs or a carbon felt 18. The annular closure plate 5 is formed and sealed with respect to the housing 4 in the same manner as previously described with respect to the embodiment of FIG. 3. An insulating material 19 is disposed between the disc-shaped positive electrode 7 and the aluminum housing 16 and is sealed to the annulus 5.

The foregoing embodiments of the invention are provided for the purpose of illustrating the inventive concepts and are non-limiting with respect to the spirit and scope of the invention which is capable of embodiment in other variants thereof.

What is claimed is:

1. A sodium-sulfur battery including positive and negative electrodes, in which sodium is the active mass of the negative electrode and sulfur or a sulfur-containing substance is the active mass of the positive electrode, said battery further including a glass electrolyte which is represented as a plurality of capillary tubes disposed substantially parallel to one another, and wherein the improvement comprises that the glass capillary tubes having outer diameters up to 1.0 mm contain the active mass of the positive electrode of the battery and are each completely sealed with fused glass of said capillary tubes and each of said capillary tubes contains a metallic wire for making electrical contact with said positive electrode mass, said wire extending substantially throughout the length of each capillary tube and passing through the wall thereof and having a diameter such that each wire occupies only a portion of the available volume in said capillary tube, the active mass of the negative electrode being located adjacent the exterior surfaces of said capillary tubes.

2. A sodium-sulfur battery according to claim 1, wherein the active positive mass is sulfur contained in a plurality of sealed capillary tubes connected electrically in parallel by means of parallel connection of said metallic wires and wherein the negative electrode is a continuous mass of sodium which is in electrical contact with a metallic battery housing.

3. A sodium-sulfur battery according to claim 1, further comprising a battery closure plate adjacent to said capillary tubes through which said metallic wires are passed to constitute the positive electrical pole of the battery.

4. A sodium-sulfur battery according to claim 1, wherein said metallic contact wires have a linear thermal coefficient of expansion in the range between $1 \times 10^{-5}$ and $2 \times 10^{-5}$ $K^{-1}$.

5. A sodium-sulfur battery according to claim 4, wherein said metallic wires are made of VA steel and each wire occupies from between 1 to 15% of the available interior volume of the capillary tubes.

6. A sodium-sulfur battery according to claim 1, wherein the outer diameter of each capillary tube lies in the range between 0.1 and 1.0 mm.

7. A sodium-sulfur battery according to claim 1, wherein said battery has a metallic housing at least one end of which is closed by a metallic closure plate which is insulated with respect to said metallic housing.

8. A sodium-sulfur battery according to claim 1, wherein the capillary tubes are arranged in a quadratic, rectangular or hexagonal array with or without mutual contact.

9. A sodium-sulfur battery according to claim 1, wherein the battery has a cylindrical housing defining internal cylindrical spaces which do not contain capillary tubes and which, when the battery is fully charged, are substantially filled with sodium and that these cylindrical spaces surround or are surrounded by arrays of capillary tubes or are contiguous to a space containing capillary tubes.

10. A sodium-sulfur battery according to claim 9, further comprising a central container which holds the substantial amount of the available sodium when the battery is fully charged and which communicates through one or more openings with the remainder of the interior volume of the battery defined by the battery housing which contains the capillary tubes.

11. A sodium-sulfur battery according to claim 1, wherein said capillary tubes are formed of glass having the approximate composition 40 mol% Na$_2$O, 12 mol% Al$_2$O$_3$ and 48 mol% SiO$_2$.

12. A sodium-sulfur battery according to claim 1, wherein said wire in each said capillary tube is disposed generally centrally of the capillary tube, the active mass of the positive electrode being located in the annular space between the wire and the internal surface of the capillary wall.

13. A sodium-sulfur battery according to claim 12, further comprising means to maintain said wire in each said capillary tube generally centrally disposed in said tube, said means comprising periodic deformations along the length of said wire, the deformations resting against the interior wall of the capillary tube so as to keep the greater length of said wire substantially away from said tubular wall.

14. A sodium-sulfur battery according to claim 1, wherein said metallic wire has a diameter in the range of 0.05–0.5 mm.

15. A sodium-sulfur battery according to claim 1, wherein said wire occupies between 1 and 15% of the capillary which contains it.

16. A sodium-sulfur battery including positive and negative electrodes, in which sodium is the active mass of the negative electrode and sulfur or a sulfur-containing substance is the active mass of the positive electrode, said battery further including a glass electrolyte which is represented as a plurality of capillary tubes disposed substantially parallel to one another, and wherein the improvement comprises that the glass capillary tubes contain the active mass of the positive electrode of the battery and are completely sealed and each of said capillary tubes contains a metallic wire for making electrical contact with said positive electrode mass, said wire extending substantially throughout the length of each capillary tube and passing through the wall thereof and having a diameter such that each wire occupies only a portion of the available volume in said capillary tube, wherein said battery comprises a housing at least one end of which is defined by a closure plate consisting at least partially of the same electrolyte glass which constitutes the capillary tubes.

17. A sodium-sulfur battery according to claim 16, wherein said closure plate is made partly from the electrolyte glass of which the capillary tubes are made and partly from magnesium oxide.

18. A sodium-sulfur battery according to claim 17, wherein said closure plate is composed of magnesium oxide ceramic having at least one opening through which the positive metallic wires may pass, said at least one opening being sealed with solder glass.

19. A sodium-sulfur battery according to claim 16, wherein said closure plate is fused to the battery housing by glass solder composed of electrolyte glass.

20. A sodium-sulfur battery according to claim 16, wherein the positive metal wires emerging from the capillary tubes are sealed into the closure plate and are at least partially insulated between the capillary tubes and the closure plate.

21. A sodium-sulfur battery according to claim 20, wherein the insulation of said wires in the space between the capillary tubes and the closure plate is provided by an electrolyte glass seal.

* * * * *